(12) United States Patent
Herrick

(10) Patent No.: US 11,384,890 B1
(45) Date of Patent: *Jul. 12, 2022

(54) BURSTING HEAD DEVICE

(71) Applicant: RODDIE, INC., Columbia Falls, MT (US)

(72) Inventor: Rod Herrick, Whitefish, MT (US)

(73) Assignee: Roddie, Inc., Columbia Falls, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,436

(22) Filed: Jun. 10, 2017

Related U.S. Application Data

(60) Continuation of application No. 15/147,980, filed on May 6, 2016, now Pat. No. 9,714,691, which is a
(Continued)

(51) Int. Cl.
*F16G 11/00* (2006.01)
*F16L 55/165* (2006.01)
*F16B 2/06* (2006.01)

(52) U.S. Cl.
CPC ............ *F16L 55/1658* (2013.01); *F16B 2/06* (2013.01); *F16G 11/00* (2013.01)

(58) Field of Classification Search
CPC ....... F16L 55/1658; F16L 55/18; H02G 1/081
See application file for complete search history.

(56) References Cited

U.S. PATENT DOCUMENTS 4,911,579 A * 3/1990 Lutz .................... E21B 7/28
175/62
5,628,585 A * 5/1997 Parish, II ............ E03F 3/06
175/53
(Continued)

FOREIGN PATENT DOCUMENTS

EP 0981006 A1 * 2/2000 .......... F16L 55/1658

OTHER PUBLICATIONS

"Guideline for Pipe Bursting", Jan. 2012, prepared for the International Pipe Bursting Association, a division of NASSCO, 11521 Cronridge Drive, Suite J, Owings Mills, MD 21117, USA.
(Continued)

*Primary Examiner* — Benjamin F Fiorello
(74) *Attorney, Agent, or Firm* — Robin Kelson Consulting, Inc.

(57) ABSTRACT

An articulating, rotating pipe bursting head device is provided. More particularly, the improved pipe bursting head device disclosed herein comprises a coupling means at the back or posterior end of the bursting pipe head device which connects the bursting pipe head device to the replacement or product pipe, typically through a universal duct puller attached to the front or anterior end of the product pipe. In one preferred embodiment, the coupling means allows for articulation of the replacement pipe relative to the bursting pipe head device. In another preferred embodiment, the articulating coupling means allows for articulation from 0° through 90°. In another embodiment, the coupling means allows for rotation of the replacement pipe relative to the pipe bursting head device. In another embodiment this rotating coupling means allows for 360° rotation. Thus, the present disclosure describes an articulating, rotating bursting pipe head device and method of use.

29 Claims, 9 Drawing Sheets

Related U.S. Application Data division of application No. 14/064,153, filed on Oct. 27, 2013, now Pat. No. 9,360,148.

(60) Provisional application No. 61/768,543, filed on Feb. 25, 2013.

(56) References Cited

U.S. PATENT DOCUMENTS

| | | | | |
|---|---|---|---|---|
| 6,109,832 | A | * | 8/2000 | Lincoln ............... F16L 55/1658 175/53 |
| 6,305,880 | B1 | | 10/2001 | Carter |
| 6,357,967 | B1 | | 3/2002 | Putnam |
| 6,913,091 | B2 | | 7/2005 | Wentworth et al. |
| 7,086,808 | B2 | * | 8/2006 | Wentworth ............... E02F 5/10 405/184 |
| 8,414,225 | B2 | | 4/2013 | Tjader et al. |
| 8,784,009 | B2 | | 7/2014 | Tjader et al. |
| 2001/0018007 | A1 | * | 8/2001 | Puttmann ............... E21B 7/30 405/184.3 |
| 2002/0081154 | A1 | | 6/2002 | Herrick et al. |
| 2003/0223823 | A1 | * | 12/2003 | Robinson ............ F16L 55/1658 405/184.3 |
| 2004/0218982 | A1 | * | 11/2004 | Wentworth ............... E21B 7/30 405/184.3 |
| 2008/0181728 | A1 | | 7/2008 | Wentworth et al. |
| 2012/0321391 | A1 | | 12/2012 | Herrick et al. |

OTHER PUBLICATIONS

Marketing Material [online; retrieved Feb. 27, 2019] Company Name:Footage Tools Company Website: https://www.footagetools.com/pipe-pullers/.

Marketing Material [online; retrieved Feb. 27, 2019] Company Name:Melfred Borzall Company Website: https://www.melfredborzall.com/products/pullers/.

Screenshots from Roddie Demonstration You Tube video "trenchless sewer line replacement in Montana", published Oct. 26, 2016. Url: https://www.youtube.com/watch?v=Bn0oSVSvL50&t=325s.

Screenshots from Akers You Tube video "Pipe Bursting in Seattle, WA (How It Works)", published Jan. 3, 2015 Url: https://www.youtube.com/watch?v=Lc5RNXoZ3BQ.

Screenshots from Advanced Trenchless You Tube video "Advanced Trenchless—Pipe Bursting of Lateral Sewer Lines", published Feb. 2, 2011. Url: https://www.youtube.com/watch?v=poqYPIhpwLI 2011.

Screenshots from Gorlitz You Tube video "Bursting Head for Trencless", published Apr. 27, 2012. Url: https://www.youtube.com/watch?v=wuPkT3SzHds.

Screenshots from Grundotugger You Tube video "Grundotugger—Pipe Bursting", published Feb. 21, 2012. Url: https://www.youtube.com/watch?v=orl4xY4a394.

Screenshots from Pipespy You Tube video "Trenchless Sewer Replacement Advantage by Pipe Spy", published Dec. 13, 2013. Url: https://www.youtube.com/watch2v=fHJAIIiUAYA.

Screenshots from TRIC You Tube video "TRIC 4" Quick-Lock Head", published Mar. 22, 2013. Url: https://www.youtube com/watch2v=poqYPIhpwLI 2011.

* cited by examiner

BURSTING HEAD DEVICE

CROSS REFERENCE TO RELATED APPLICATIONS

This application claims the benefit of patent application U.S. Ser. No. 15/147,980, filed May 6, 2016, which claims the benefit of U.S. Ser. No. 14/064,153, filed Oct. 27, 2013, now U.S. Pat. No. 9,360,148, which claims the benefit of Provisional Application No. 61/768,543, filed Feb. 25, 2013, the disclosures of which are hereby expressly incorporated in their entirety by reference herein.

FIELD OF USE

Embodiments of the present disclosure find applicability in the field of systems designed to pull cable and/or pipe through space underground. One useful field includes systems for bursting and replacing gas, water, sewer or other underground pipes.

BACKGROUND

This disclosure relates to devices and methods typically used for simultaneously bursting or destroying buried pipes and pulling a replacement pipe though the same location as the destroyed pipe. Such methods of pipe replacement are sometimes referred to as "trenchless pipe replacement systems" and require only two pits to be dug, one at each end of the pipe to be replaced. One end of a pulling cable is attached to the front end of a bursting pipe head device, and the other end is threaded through the existing pipe from an entry point accessible in the entry pit and provided to a pulling apparatus located in the exit pit. The pulling apparatus then pulls the cable and the attached bursting pipe head device through the existing cable, typically by a hydraulic mechanism. The bursting pipe head device bursts or fractures the existing pipe as it is pulled through, and brings with it replacement or product pipe attached at the back end of the bursting pipe head device.

There is an on-going desire to minimize the size of the pits to be dug; increase the facility and ease for (1) introducing replacement pipe into the existing pipe location, (2) pulling the replacement pipe through the existing pipe; and (3) disengaging the cable and removing the bursting pipe head device from the replacement pipe once it is in place; as well as increasing the facility and ease of maintaining and using a bursting pipe head device.

Bursting head devices and methods of use are well-known and characterized in the art. Typically, these devices include (1) a pipe bursting head typically having a tapered nose or leading portion and structured to break apart the existing pipe as the bursting head is pulled through the existing buried pipe, (2) a cable connection that allows cable to pull the pipe breaking head through the existing buried pipe, and (3) a means for connecting new replacement pipe to the back end of the bursting head so that the cable pulls the new pipe into and through the existing buried pipe as it is burst by the bursting head. Typically, a hydraulic pulling device pulls the cable and the attached bursting head and replacement pipe through existing buried burst pipe.

The bursting pipe head devices of the art typically have a static, non-flexible means for connecting the new pipe to the back end of the bursting head device. This inability to allow movement, rotation or flexing at the connection point makes entry of the new pipe into the existing pipe at the starting point or entry pit difficult, often requiring the need to dig a larger pit than desired, so as to reduce the angle of entry of the new pipe into the buried pipe.

In addition, existing bursting pipe head devices of the art typically use a pin and clevis type arrangement external to and extending from the front end of the device to attach cable to the bursting head, typically by means of a swaged connection. Alternatively, the cable is attached to the bursting head by means of an internal clamping mechanism. The external cable attachment devices are limited in utility in that external attachment adds to the overall length of the device, thereby limiting the distance the bursting head device can be pulled into the exit or pulling pit from the buried pipe terminus with pulling devices of the art. This can require the need to dig the bursting head device out of the earth. The internal clamping mechanisms of the art also can be difficult and problematic from which to disengage the cable easily once the replacement pipe is in place. Moreover, where the cable connection is by means of an internal clamping mechanism, ready access to the internal clamping mechanism and/or ease of cable release is lacking in the pipe bursting head devices of the art.

US Patent Application Publications 2002/0081154 A1, US 2008/0181728, and US 2012/0321391 A1, and U.S. Pat. Nos. 6,357,967 B1 and 6,913,091 B2 are representative of the state of pipe bursting head devices and methods of use in the art.

The present disclosure describes improvements in the bursting head device and method of use that overcomes deficiencies in the bursting pipe head devices and methods of the prior art.

SUMMARY OF THE INVENTION

This summary is provided to introduce a selection of concepts in a simplified form that are further described below in the Detailed Description. This summary is not intended to identify key features of the claimed subject matter, nor is it intended to be used on its own as an aid in determining the scope of the claimed subject matter.

In accordance with one embodiment of the present disclosure, an articulating, rotating pipe bursting head device is provided. More particularly, the improved pipe bursting head device disclosed herein comprises a coupling means at the back or posterior end of the bursting pipe head device which connects the bursting pipe head device to the replacement or product pipe, typically through a universal duct puller attached to the front or anterior end of the product pipe. In one preferred embodiment, the coupling means allows for articulation of the replacement pipe relative to the bursting pipe head device. In another preferred embodiment, the articulating coupling means allows for articulation from 0° through 90°. In another embodiment, the coupling means allows for rotation of the replacement pipe relative to the pipe bursting head device. In another embodiment this rotating coupling means allows for 360° rotation. Thus, the present disclosure describes an articulating, rotating bursting pipe head device and method of use.

In accordance with another embodiment of the present disclosure, the coupling mechanism disclosed herein allows for quick attachment and release of a product or replacement pipe from a pipe bursting head device or cone without requiring bolting. In one embodiment, the coupling mechanism comprises a clevis fastener means comprising a clevis protruding from the back or posterior end of the bursting pipe head device, a tang protruding from the front or anterior end of the universal duct puller, and a clevis pin that engages the clevis and the tang. In another embodiment the clevis pin is threaded and the corresponding openings on the clevis and tang are dimensioned to receive the clevis pin also are threaded to receive and hold the clevis pin, thereby securely coupling the universal duct puller to the bursting pipe head device without need for a cumbersome bolting mechanism. Release of the clevis pin allows quick release of the universal duct puller and attached product pipe from the bursting pipe head device. In a preferred embodiment the back or posterior end of the bursting pipe head device comprises a detachable end cap with an axial opening and the clevis comprises an independent, internally located component that protrudes through the end cap axial opening and acts as a swivel. The clevis swivel component comprises a posterior end and an anterior end. The posterior end of the clevis swivel component comprises the clevis and is dimensioned to pass through and protrude from the end cap axial opening, and the anterior end is dimensioned to be larger than the end cap axial opening such that the clevis component sits against the interior surface of the end cap and can swivel relative to and independent of the end cap when seated against the end cap. In another embodiment, the anterior end of the clevis component acts as a bracer or backstop for a compressible spring and free cable end in the clamping mechanism disclosed herein. Similarly, the tang also can protrude through an axial opening at the anterior end of the universal duct puller, such that it too acts as an independently swiveling component relative to the pipe pulling mechanism.

In accordance with another embodiment of the present disclosure, a magnetized internal cable clamping mechanism is used to attach the pulling cable to the bursting pipe head device. The improved internal cable clamping or cable gripping mechanism disclosed herein comprises a plurality of 2 to 4 pieces which together form a cone whose outer camming surface engages the interior surface of the bursting head cone, and whose inner surface is threaded and defines an axial hole of a dimension to engage the cable surface and bite into the cable. Accordingly, the cable clamping or gripping members act like cable clamping jaws, also known in the art as cable gripping jaws or cable gripper jaws. In addition, the joining surface on each member piece of the cable clamping cone comprises a magnet located to align with the magnet on the corresponding joining surface of the other member piece or pieces, and indexed so that all the magnets either are positive or negative and will repel one another when the member pieces are joined and the magnets are aligned. In one embodiment, the magnetized internal cable clamping mechanism comprises three member pieces. In another embodiment, the magnet is embedded in the member joining surface such that it lies flush with the member joining surface. In still another embodiment, the magnet is located at the balance point of the cable clamping member. When used in the method described herein, the improved magnetized cable clamping mechanism acts as a part of a quick cable release mechanism, improving the facility and ease of disengaging a pulling cable from a bursting pipe head device.

In accordance with another embodiment of the present disclosure, a bursting pipe head device is provided comprising a housing with two members: a pipe bursting head cone and a mechanically detachable end cap that fits into the back or posterior end of the cone. In a preferred embodiment the end cap engages with the head cone by means of an easily removable quick-locking mechanism, allowing easy access to the interior of the head cone. In still another preferred embodiment the quick-locking mechanism comprises a twist-locking mechanism. In another embodiment the interior surface of the head cone has a smaller diameter than the exterior surface and its posterior axial opening is dimensioned to receive the end cap. Further, the posterior axial opening comprises two slots spaced 180° apart and, 90° to each slot, comprises a protrusion. Similarly, the engaging anterior end of the end cap has a smaller diameter than its posterior end, and comprises two protrusions spaced 180° apart and dimensioned to fit in and pass through the slots on the interior surface at the posterior end of the head cone. The engaging anterior end of the end cap also comprises two slots spaced 180° apart and 90° to each protrusion on the end cap, dimensioned to allow the protrusions on the posterior end of the head cone to fit in and pass through the slots on the end cap. When the protrusions on the end cap are fit into and pass through their corresponding slots on the head cone, the end cap and cone are engaged. The end cap then can be rotated or twisted 90° or 270° such that the protrusions on the end cap now lie anterior to the protrusions on the head cone and the end cap is in a locked position. In another preferred embodiment, the locked position of the end cap is indexed and fastened by means of a set screw which passes through a threaded opening dimensioned to receive the set screw in the end cap and a corresponding recess on the head cone posterior surface, typically at 90° to one of the head cone slots. In still another embodiment, the quick-locking end cap disclosed herein further comprises an axial opening or hole smaller than the diameter of the head cone engaging mechanism and dimensioned to receive the clevis component disclosed herein.

In accordance with another embodiment of the present disclosure, a cable engaging and quick-release mechanism, tool and method are provided. In one preferred embodiment, a bursting pipe head device comprising an internal cable engaging mechanism and quick-release tool is disclosed. In another preferred embodiment, a bursting pipe head cone is provided whose anterior end defines a threaded axial hole or opening. Also provided is a mechanical screw comprising threads and dimensioned to fit and screw into the threaded axial hole or opening of the bursting cone anterior. The mechanical screw itself defines an axial hole dimensioned to receive and allow a free cable end to pass through, and its anterior surface comprises two slots spaced 180° apart. Each slot of the mechanical screw is competent to receive the spanner pin of a cable release spanner tool or key disclosed herein. In one preferred embodiment the mechanical screw comprises left-handed threads.

In another embodiment, a cable release spanner tool or key is disclosed, wherein the tool body comprises (half) of a cylindrical body having an axial opening of a dimension such that the cylindrical body of the tool can engage or lay or sit on a cable. The anterior end of the spanner tool comprises two spanner pins spaced 180° apart, each dimensioned to fit in the spanner slots of the mechanical screw. The spanner tool further comprises means for turning the tool once the spanner pins of the tool are engaged in the spanner slots of the mechanical screw. In another embodiment, the spanner tool comprises a means for facilitating turning the screw. In a preferred embodiment, the tool comprises at least one and preferably two arms that extend radially from the tool's cylindrical body, each arm spaced 180° apart and providing the means for turning the mechanical screw. In another embodiment the inner surface of the spanner tool cylindrical body comprises a magnet such that the spanner tool is engaged with the cable on which it sits by means of magnetic attractive force. In still another embodiment, the magnet is embedded in the internal surface of the tool's cylindrical body such that it lies flush with the internal surface of the cylindrical body. In another embodiment the cable engaging and quick-release mechanism disclosed herein comprises (1) the cable quick release tool disclosed herein; (2) the threaded mechanical screw; (3) the magnetized cable clamping mechanism disclosed herein; (4) a compressible spring that engages the posterior surface of the magnetized clamping mechanism; and (5) a surface posterior to the spring that is competent to brace the back end of the spring and restrict lateral movement of the spring and magnetized clamping mechanism. In another embodiment the brace, also referred to herein as a backstop, comprises the anterior end of the clevis component disclosed herein. In still another embodiment, the spring defines an axial opening competent to receive a free cable end and allow it to pass therethrough.

The cable engaging and quick release method disclosed herein comprises providing a bursting pipe head device having a substantially hollow cylindrical body comprising a cone having an axially hollow interior, a threaded opening at its anterior end, and an end cap at its posterior end. The end cap and cone together, when engaged, define an interior cavity competent to house, in anterior progression from the end cap interior, the following components: a spring bracing surface, a compressible spring, the magnetized cable clamping mechanism disclosed herein, and the threaded mechanical screw disclosed herein. Each of these components, together with the end cap and cone, are dimensioned axially such that, when the mechanical screw is at least partially threaded into the anterior opening of the cone, the posterior end of the screw is contiguous with the anterior end of the magnetized cable clamping mechanism, the posterior end of which is contiguous with the anterior end of the compressible spring, and the posterior end of the compressible spring is contiguous with the bracing surface or backstop. In a preferred embodiment the bracing surface comprises the anterior end of the clevis swivel component disclosed herein. The free end of a cable is then provided to the interior of the bursting head cone by feeding the cable through the axial hole of the mechanical screw. The quick release spanner tool or key then is placed on the cable so that the spanner pins on the tool engage with the spanner slots on the mechanical screw, and the tool is rotated about the cable to thread the mechanical screw into the cone's anterior opening. This process pushes the cable clamping members apart and compresses the spring behind them. The cable end then is manually pushed further into the cone head such that it passes beyond the cable clamping mechanism. In one preferred embodiment, the cable passes through the spring and comes to rest against the bracing surface. The spanner tool then is turned in the opposite direction to unscrew the mechanical screw until its anterior surface is flush with the cone head's anterior opening. As the screw is moved back out of the cone head interior, the spring decompresses and the cable clamping members are pushed forward towards the cone nose until its interior dimensions limit further forward movement of the cable clamping cone, forcing the cable clamping cone members down onto the cable surface. The interior threaded surfaces of the clamping members allow the members to bite into the cable, acting like a clamping jaw. The cable now is engaged in the bursting pipe head device and ready for pulling. As force is applied pulling the cable, for example into and through the underground pipe to be replaced, the cable clamping members act as chinese handcuffs, increasing their grip on the cable by means of the serrations, teeth or threaded ridges on their cable engaging surfaces as the limiting tapered bursting head nose interior surface further compresses the members together and down on to the cable surface.

Once replacement or product pipe is in place, and/or an operator desires to release the cable from the bursting head device, the spanner tool is placed back on the cable, the tool's spanner pins are engaged in the spanner slots on the mechanical screw, and the spanner tool turned to thread the screw back into the cone interior, which compresses the spring and releases the clamping jaw members from the cable surface, allowing the cable to be pulled out of the cone head opening. In a preferred embodiment the mechanical screw comprises left-hand threads and the spanner tool is turned clock-wise to thread the screw into the cone head interior and expand the cable clamping mechanism to allow entry or exit of a free cable end, and turned counter-clockwise to unthread the screw out of the cone head interior sufficient to expand the spring and push the clamping mechanism down onto a cable surface. In another preferred embodiment the cable clamping jaw members are magnetized such that adjoining members repel each other sufficiently to push the members back and away from the cable surface and each other in their disengaged open position such that they do not interfere with the cable as it is being extracted.

DESCRIPTION OF THE DRAWINGS

The foregoing aspects and many of the attendant advantages of this disclosure will become more readily appreciated as the same become better understood by reference to the following detailed description when taken in conjunction with the accompanying drawings, where like-numbered parts reference like-membered components and wherein.

DETAILED DESCRIPTION

Embodiments of the present disclosure provide devices, components, mechanisms and methods of use directed to trenchless systems for pulling a cable or replacement pipe through an existing underground pipe.

Figure 1:
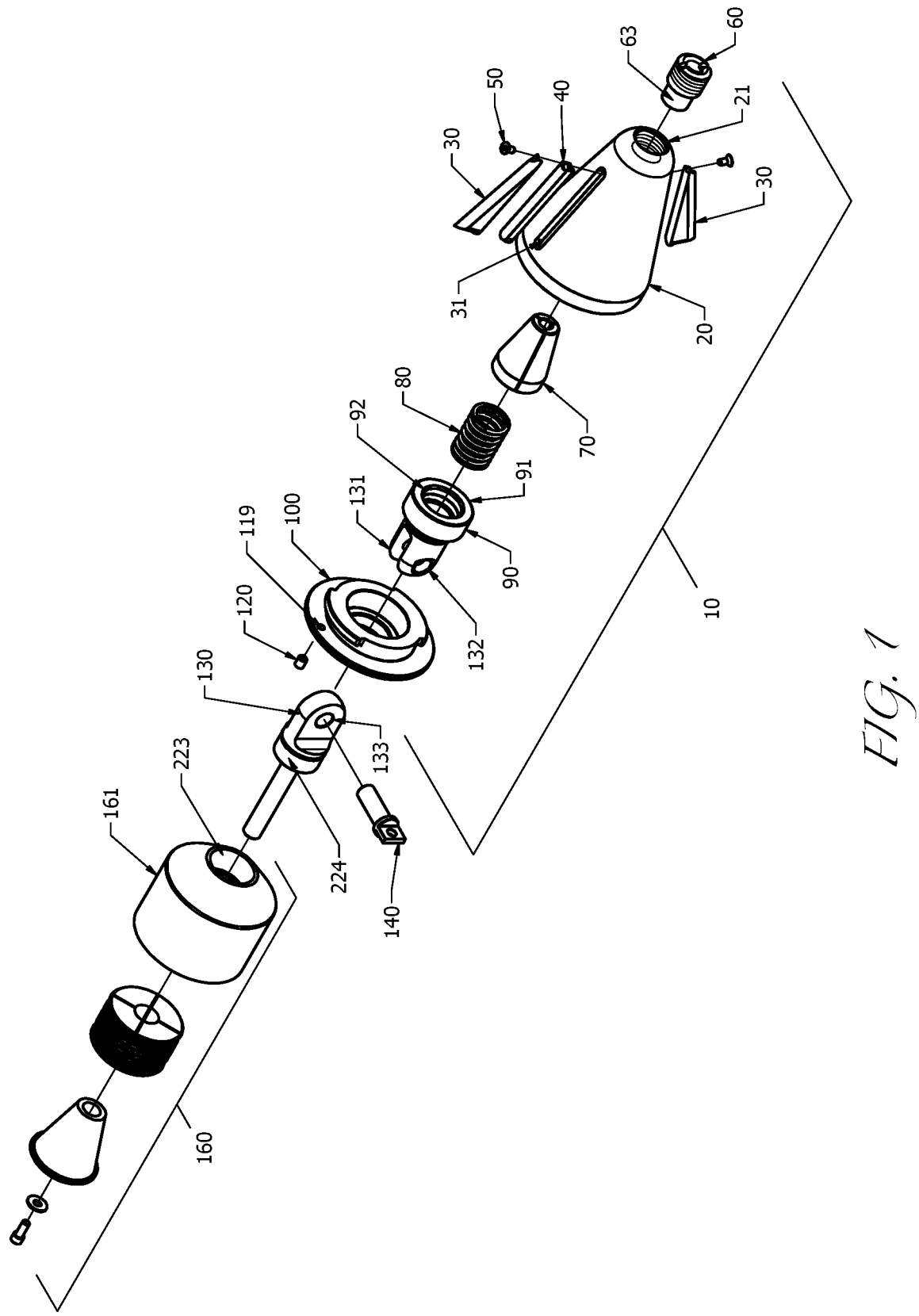
FIG. 1 is an exploded view of a bursting pipe head device in accordance with embodiments of this disclosure, coupled to a universal duct puller in accordance with one embodiment of this disclosure.
Figure 2:
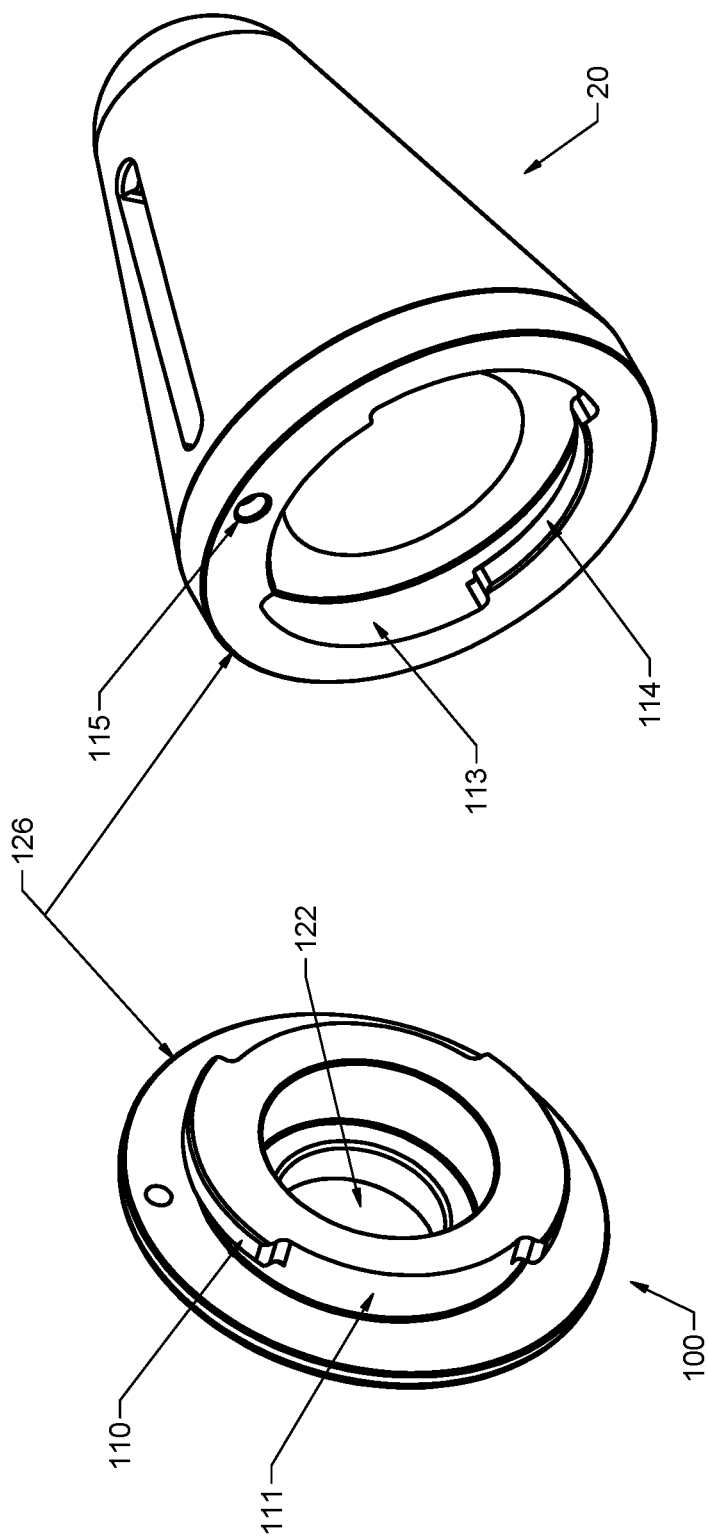
FIG. 2 is an exploded view of a bursting pipe head device in accordance with embodiments of this disclosure comprising a quick-locking nose cone head and end cap in accordance with one embodiment of this disclosure.

Referring to FIGS. 1 & 2, one embodiment of an improved bursting pipe head device in accordance with the present disclosure is shown. The bursting head device 10 comprises a conically shaped bursting cone 20 and an end cap 100 at its posterior end. As will be understood by those of ordinary skill in the art, the anterior portion of the conical bursting cone has an outer diameter that is less than the interior diameter of an existing pipe to be fractured or cut, and a posterior end that is larger than the interior diameter of the existing pipe, so that, as the bursting pipe head device is being pulled through the existing pipe, it fractures or cuts or bursts the pipe by virtue of its size. The device of the present disclosure is useful for bursting pipe of myriad materials including, without limitation, tile, cement and PVC. If desired, the bursting cone can include one or more sharpened cutting knives 30 arranged radially about the cone head. The knives can be mechanically attached or welded on or machined integrally with the cone head body. The embodiment shown in FIG. 1 illustrates a blade 30 that sits in a channel 31 on the cone head outer surface, the knife being attached to the cone head body by means of a pin 50. Component 40 is a "blank" dimensioned to sit in channel 31 such that it lies flush with the cone body outer surface, in the event a blade on the cone body surface is not desired or needed. The blank 40 also is attached to the cone body surface by means of a pin 50. Useful blade lengths range from about 1-inch to 5-inches, and have an angle in the range of about 15°-35°, more preferably in the range of about 20-25°. The blade or blades serve to concentrate stress on the inside of brittle pipe, particularly cement or tile pipe, causing them to fracture. Where the existing pipe is plastic the blades typically are competent to cut through the pipe. Of course, as will be appreciated by those having ordinary skill in the art, the bursting cone can be constructed without a channel 31 or a blade 30.

Useful cone body lengths and angles can vary and it is within the skill in the art to manipulate these for a desired outcome. Typically, the smaller the bursting pipe head device, the further the device can be pulled into the exit pit, which can make for easier cable extraction and product pipe release. Useful cone body lengths for bursting 4-inch pipe for example, range from about 6 inches to 12 inches, typically in the range of about 8 inches to 10 inches. Useful cone body outer angles on the devices of the present disclosure range from about 15° to 40°, more typically in the range of about 20° to 30°. Similarly, useful interior cone body angles typically are about half those of the selected outer angle. These ranges are well known to those of ordinary skill in the art.

The cone head body 20 is hollow or at least partially or substantially so, and has an opening 21 at its anterior end into which a compressing element 60 can be threaded. In one embodiment the compressing element is a mechanical screw. In another embodiment the mechanical screw threads into the anterior opening 21 of the cone head body using left-handed screw threads. The compressing element also defines an axial hole or opening competent to receive the free end of a cable. As will be described in detail below, the compressing element is part of the cable-engaging and quick-release mechanism of the present disclosure. As will be understood by those of ordinary skill in the art, as the engaged cable (see below) is pulled, it tends to try to unwind in a clock-wise or right-handed manner. This natural tendency of the cable puts force pressure on the mechanical screw threaded into the cone head body and would tend to unscrew it if it were threaded with right-handed threads.

Referring now to FIGS. 1-4, a bursting pipe head device 10 is shown comprising a a cone 20 and a quick-locking end cap 100. The interconnecting surfaces of the end cap 100 and the cone body 20 are dimensioned to match one another, providing a flush surface at the connection point 126, FIGS. 2 and 4. The quick-locking mechanism described herein allows easy and ready access to the interior of the head cone body and the components inside. In one embodiment shown in FIG. 3B, the posterior end of the cone head body 123 has an inner surface 125 that defines a narrower diameter than the outer surface 124, the inner surface being dimensioned to receive the end cap. In another embodiment the inner surface 125 defines two slots 113 spaced 180° apart and, 90° to each slot a protrusion defining a lip 114, for a total of two protrusions or lips spaced 180° apart.

Similarly, the engaging anterior end of the end cap 121 (FIG. 3A) comprises an inner surface 118 that defines a neck having a narrower diameter than the outer surface 222 at the posterior end of the end cap 117. In one embodiment, the inner surface 118 defines a diameter equivalent to and matches the inner surface diameter 125 of the cone head posterior end. The anterior end of the end cap further comprises two protrusions 110 spaced 180° apart and dimensioned to fit in and pass through the two slots 113 on the cone head. It will be appreciated by those of ordinary skill in the art that, if desired, the slots and protrusions on either the end cap or cone body could be located at an angular distance different than 90° from each other, and that what is key is that the angular distance selected is the same on both the end cap and the cone body. It also will be appreciated that, while two slots and two protrusions are shown in the illustrative embodiment provided in FIG. 3, a fewer or larger number of slots and protrusions can be fabricated. Again, what is key is that the number of slots and protrusions selected correspond on both the end cap and the cone body.

The engaging anterior end of the end cap also comprises two slots 111 spaced 180° apart and 90° to each protrusion 110, the slots 111 being dimensioned to allow the protrusions 114 on the head cone to fit in and pass through them. When the end cap protrusions 110 are fit into and pass through the slots 113 on the cone head, the end cap and cone body are engaged. The end cap then can be rotated or twisted 90° or 270° such that the end cap protrusions 110 now lie anterior to the protrusions 114 of the cone body and the end cap is now in a locked position. In another embodiment the locked position of the end cap is fastened by means of a set screw 120 that passes through a threaded opening 119 dimensioned to receive the set screw and located on the end cap outer diameter surface. In still another embodiment, a recess 115 located at the 90° and/or 270° position on the cone body outer surface identifies the position for tightening the set screw with, for example, an allen wrench 116 (FIG. 4), allowing the locked position to be easily located and indexed.

Referring now to FIGS. 1-5, one embodiment of an improved means for coupling the bursting pipe head device to a product pipe carrier 160 is shown. Typically, the product or replacement pipe carrier comprises a universal duct puller 160. However, other product pipe carrier components or means for engaging and carrying a product pipe 170 are contemplated to be useful and are not considered central to the present disclosure. The coupling means disclosed herein allows for quick attachment and release of the product pipe carrier component without requiring bolting or other attachment means of the prior art.

Figure 5A:
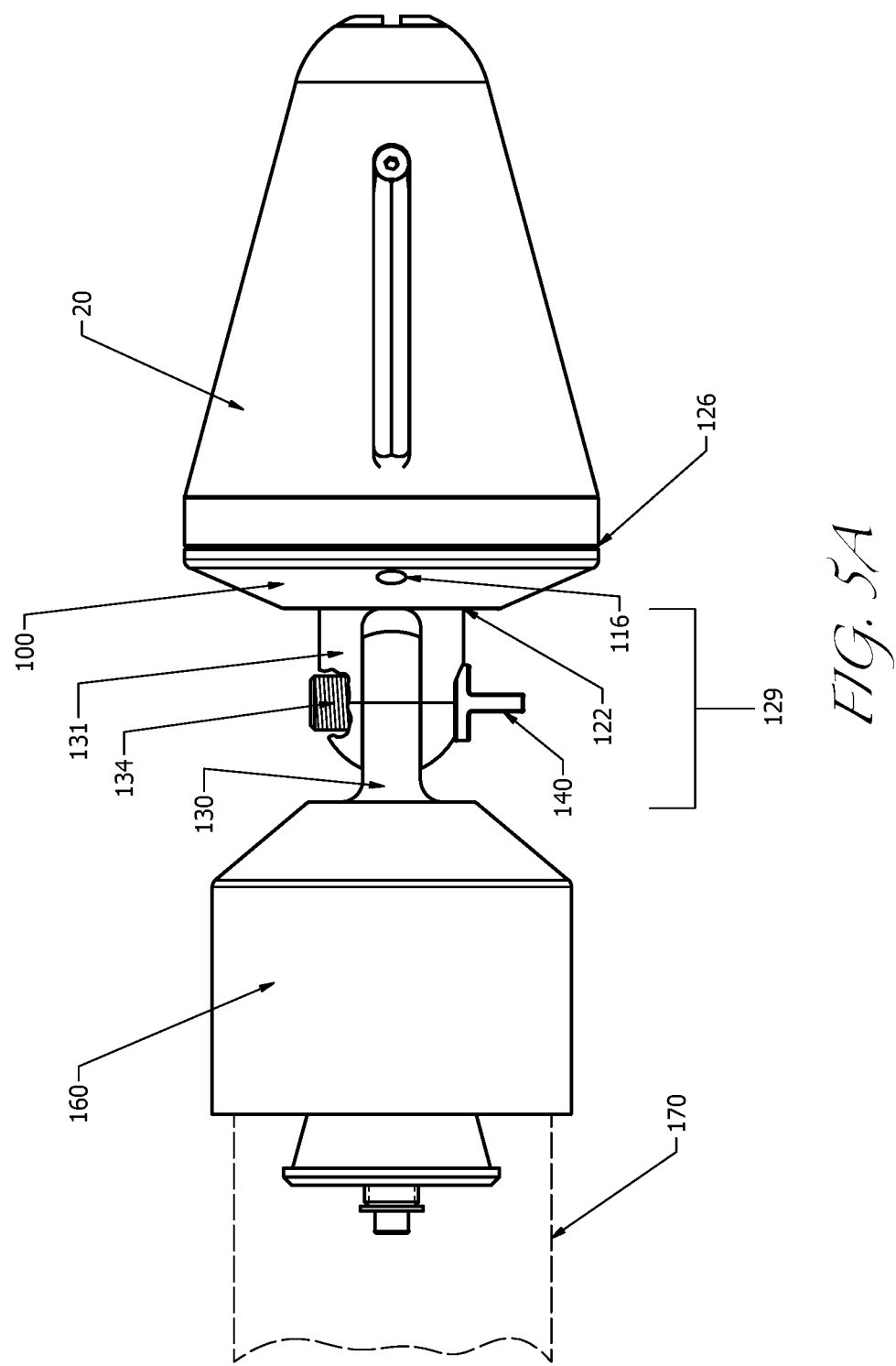
FIGS. 5A and 5B illustrate (A) the coupling mechanism in accordance with one embodiment of this disclosure and useful for coupling a pipe bursting head device to a product pipe; and (B) examples of the available articulation and rotation possible with this coupling mechanism.
Figure 5B:
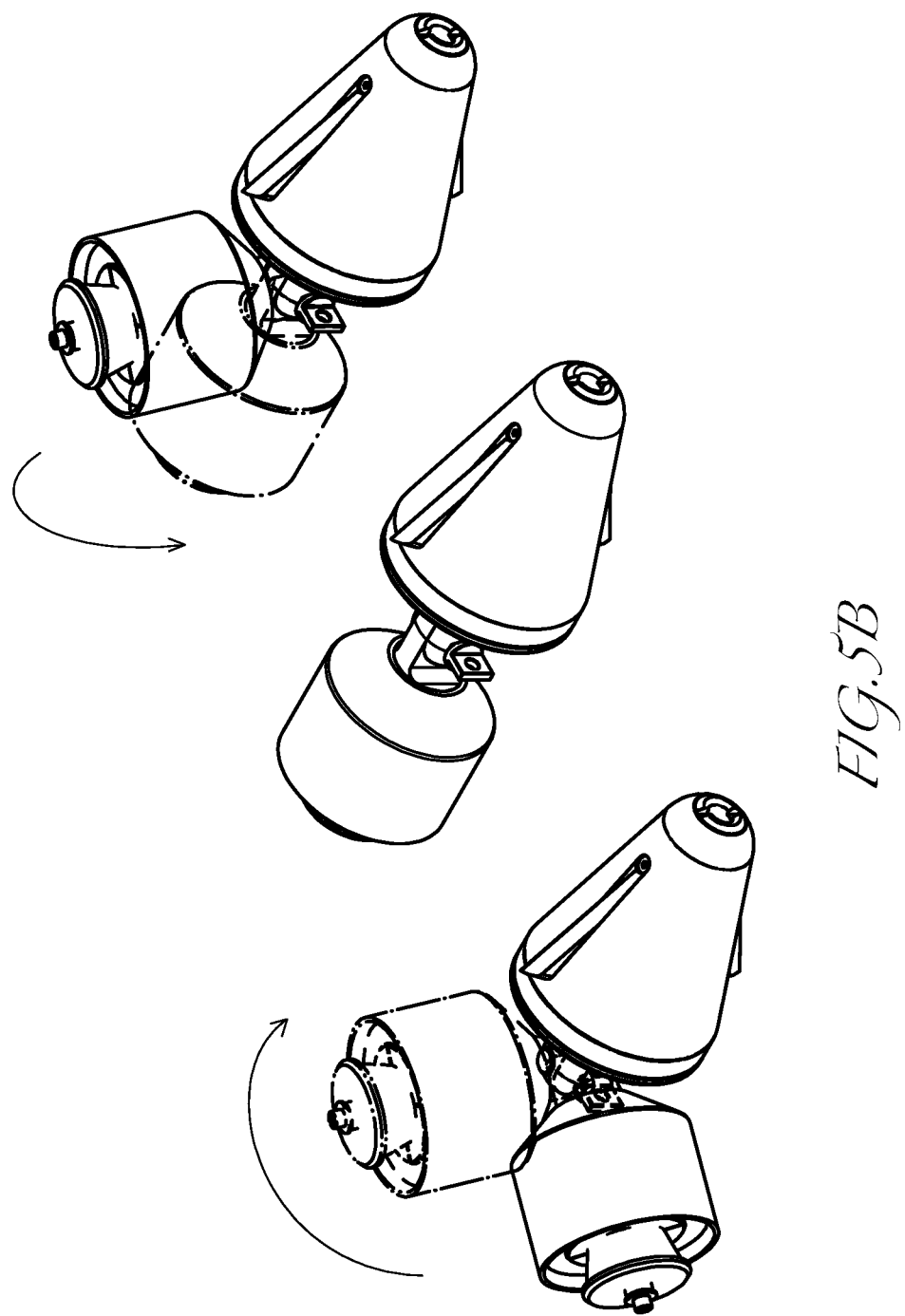

In one embodiment the coupling mechanism comprises a clevis 131 protruding from an axial opening in the end cap 100 posterior end 117 (FIG. 3A), a tang 130 protruding from the anterior end of the product pipe carrier means 160, and a clevis pin 140. It will be appreciated by those having ordinary skill in the art that the tang can be integral to the pipe pulling mechanism, or it can protrude through an opening in the anterior end of the mechanism as embodied in FIG. 1. In one preferred embodiment the clevis pin 140 is threaded 134 (FIG. 5A) as are the corresponding clevis pin holes or openings in the clevis arms 132 and the tang 133 dimensioned to receive the clevis pin, such that when the clevis pin is threaded into the clevis pin holes on the clevis and tang, the bursting pipe head device is secured to the product pipe carrier component. Releasing the bursting pipe head device from the product pipe carrier component requires only unthreading or otherwise removing the clevis pin from the tang and clevis. In addition, the clevis, tang and pin arrangement together allow for the product pipe carrier to be articulated up to 90° in any direction relative to the bursting pipe head device (FIG. 5B). This has the advantage of allowing flexibility between the product pipe carrier component and the bursting pipe head device. In the devices of the prior art the coupling mechanism renders the product pipe fixed and static relative to the bursting pipe head device, making entry of the replacement or product pipe into the existing pipe opening in the entry pit difficult. The sharp angle of entry that results from an inflexible coupling mechanism often required digging larger entry pits than desired, and/or providing strong bracing, and/or providing mechanical adaptions and wedging so as to minimize the angle of entry of the replacement pipe and bring the product pipe into alignment with the pipe bursting head and the existing pipe entry point. With the articulating coupling mechanism disclosed herein, these entry issues are obviated or substantially reduced.

Figure 3A:
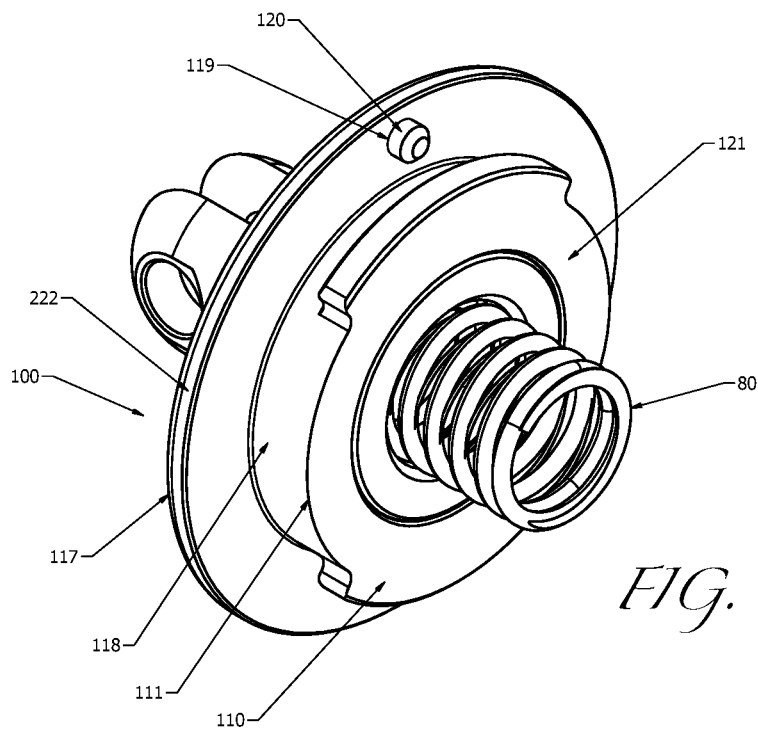
FIGS. 3A and 3B illustrate (A) the interlocking surface of the end cap illustrated in FIG. 2 in accordance with one embodiment of this disclosure; and (B) the end cap interlocking surface of the bursting cone illustrated in FIG. 2 in accordance with one embodiment of this disclosure.

In another embodiment, the clevis 131 is associated with the end cap 100 in such a way as to allow articulation and rotation (FIG. 5B) of the product pipe relative to the bursting pipe head device. More particularly, in a preferred embodiment the end cap posterior end 117 comprises an axial opening 122 dimensioned to receive and allow the clevis to pass through and protrude therefrom. (FIGS. 2 and 3A). The anterior end 91 of the clevis component has a diameter larger than the axial opening 122 such that the clevis component sits against the interior surface of the end cap posterior axial opening and the protruding clevis can swivel 360° in the opening. When the clevis and tang are engaged, the product pipe now can swivel in any direction relative to the bursting pipe head (FIG. 5B), allowing the product pipe to be pulled into and through existing pipes having corners or angles, and/or changes in depth. As will be appreciated by those having ordinary skill in the art, the independently rotating and swiveling clevis-tang coupling mechanism allows full range of rotation and articulation of the replacement pipe coupling mechanism 160 and pipe 170 about the bursting head device (FIGS. 5A and 5B). In another preferred embodiment, the tang 130 itself protrudes from an axial opening 223 in the anterior end of the replacement pipe pulling mechanism housing 161 (FIGS. 1 and 4), allowing the replacement pipe to rotate or swivel independently about the tang barrel 224.

In another preferred embodiment the clevis swivel component 131 has an anterior end 91 dimensioned to receive a compressible spring 80. In one embodiment the anterior end 91 comprises a flat, tapered, dimpled or concave surface having a diameter competent to receive the posterior end of a spring 80. In another embodiment, the clevis swivel component anterior end 91 defines an axial opening 92 having a diameter competent to receive the spring 80, the opening extending some distance into the clevis swivel component interior and terminating at some point within the clevis component so as to act as a brace or backstop 93 for the posterior end of spring 80 and against which the spring can be seated. In one embodiment, the axial opening extends in the range of about 0.25 inches to 3 inches into the clevis swivel interior. In another embodiment, the axial opening extends 0.5 inches to 2 inches to the clevis swivel interior. In another embodiment, the brace or backstop is generated by reducing the diameter 90 of the axial opening, thereby creating a ledge 93 on which the spring sits. In another embodiment, the clevis axial opening terminates at a point distal to the backstop ledge that seats the compressible spring, preferably tapering to a point, and having a diameter dimensioned to receive a free cable end. In another embodiment, the brace or backstop is created by eliminating the opening completely, creating a floor on which the spring sits. In still another embodiment the compressible spring 80 itself defines a hollow channel dimensioned to allow a free end of a cable 200 (FIG. 7D) to pass therethrough. In a preferred embodiment, the cable passes through the spring and continues further into the clevis component until it terminates at a tapered terminus of the clevis opening. In still another embodiment, the posterior end of the compressible spring 80 can be attached or joined or otherwise made integral with the backstop surface on the clevis anterior end axial opening such that the clevis and compressible spring are one component. FIG. 3A illustrates one end cap embodiment of the disclosure wherein the end cap posterior axial opening has received the clevis 131 and the clevis anterior axial opening has received the hollow compressible spring 80.

Figure 6:
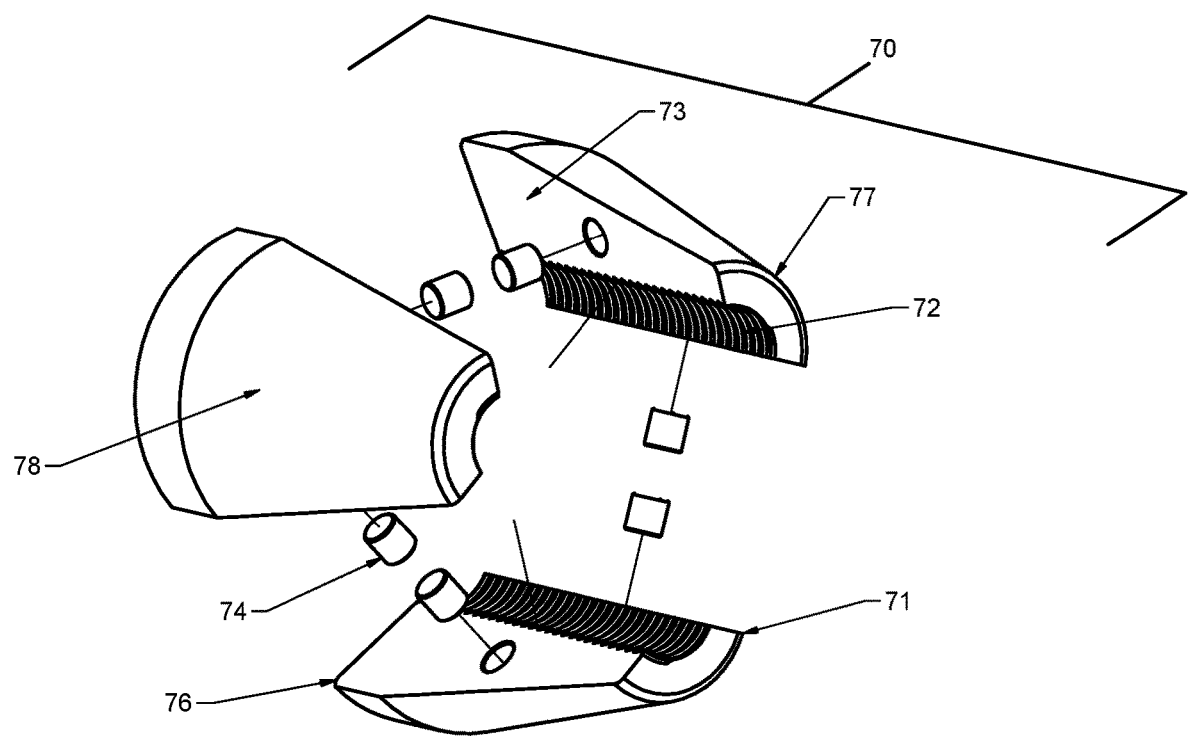
FIG. 6 is an exploded view of a cable clamping mechanism in accordance with an embodiment of this disclosure.

Referring now to FIGS. 1, 6 and 7, embodiments of a bursting pipe head device disclosed herein are shown, having an improved internal mechanism and means for engaging and releasing a pulling cable 200. Referring in particular to FIGS. 6 and 7, a magnetized internal cable clamping or cable gripping mechanism 70 is shown. The mechanism comprises multiple member pieces 77, typically between 2-4 pieces. In one embodiment illustrated herein, the clamping mechanism comprises three member pieces. The member pieces fit together to define a hollow cone 70 having an outer camming surface 78 competent to engage the interior surface of the bursting pipe head cone, and an inner surface 72 that defines an axial hole or channel of a dimension and texture competent to engage a pulling cable surface 200 and bite into the cable. In a preferred embodiment the outer camming surface 78 is smooth, reducing friction as the camming surface moves along the interior surface of the bursting head cone nose. The axial opening 72 provided by the member pieces is formed by a channel that runs centrally down the length of each member piece. In a preferred embodiment, the inner surface or channel 72 is threaded such that the threads act like teeth to bite into the cable and the cable clamping cone acts as a clamping jaw or cable gripping jaw. The joining surface 73 on each member piece comprises a magnet 74 located to align with the magnet on the corresponding joining surface on each member piece. In one embodiment, the magnet is embedded in the member joining surface such that it lies flush with the member joining surface. As will be appreciated by those having ordinary skill in the art, a range of magnet sizes and magnetic force may be used effectively in the devices disclosed herein. In one embodiment, a preferred magnet size is ¼-inch by ¼-inch, although larger and smaller magnet sizes are contemplated. In another embodiment, a magnet strength of N50 is used, and magnets of stronger and weaker strength also are contemplated. A selected magnet strength will be competent to repel two adjacent member joining surfaces from one another. In another embodiment, the magnet is located at the balance point on the member joining surface, and other positions on the member joining surface also can be used for locating the magnet, provided the position selected is the same on each member joining surface. In another embodiment, the magnets are indexed so that the same pole (positive or negative) is exposed on each member joining surface such that the magnets repel one another when two member joining surfaces are joined and the magnets are aligned. In the embodiment shown in FIGS. 6 and 7 the cable clamping cone 70 comprises three member pieces 77 and one magnet per member joining surface 73. It will be appreciated by those skilled in the art that more magnets could be utilized if desired.

Figure 3B:
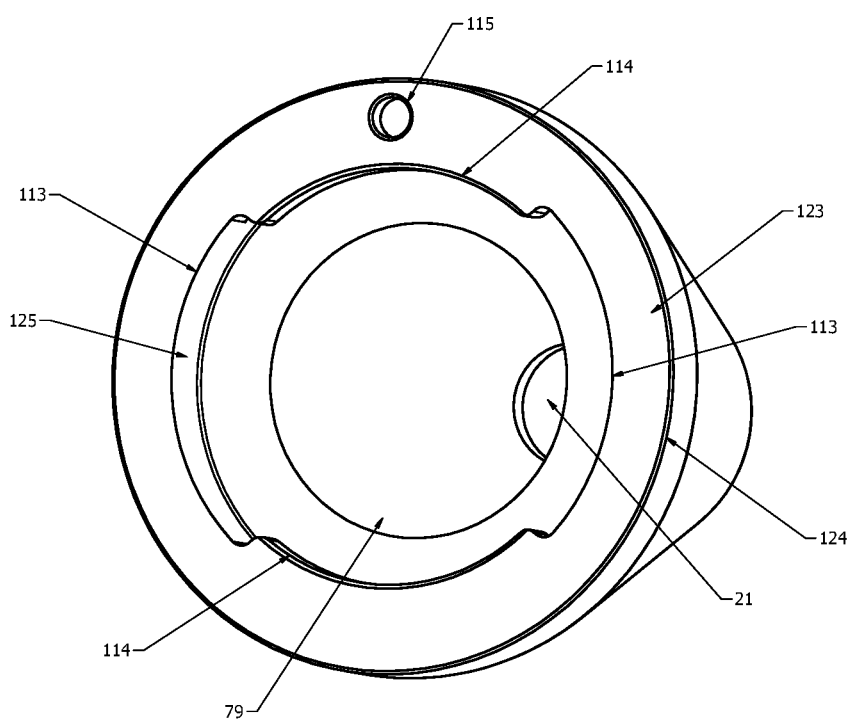
Figure 4:
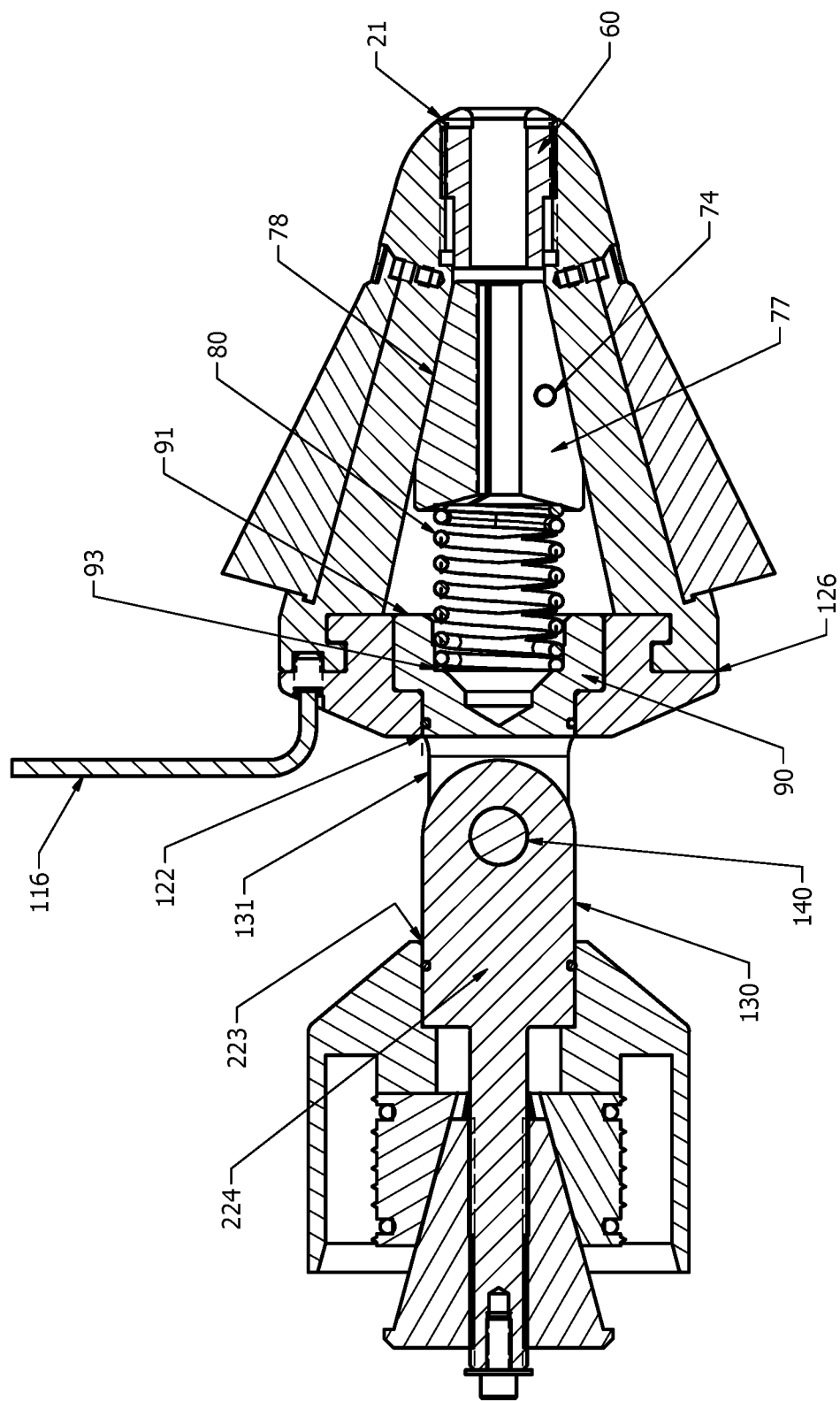
FIG. 4 is a cross-section view of a bursting pipe head device in accordance with embodiments of this disclosure, coupled to a universal duct puller in accordance with one embodiment of this disclosure.

Referring now to FIGS. 1, 3B, 4 and 6, the cable clamping cone 70 has an angular ratio proportional to the angle of cone body hollow interior 79, such that the outer camming surfaces 78 of the cable clamping cone engage the interior surface of the bursting head cone, particularly towards the anterior end of the head cone (FIG. 4). As illustrated in FIGS. 1 and 4, the cable clamping mechanism disclosed herein comprises the cable clamping cone 70 fitted into the cone head body 10, together with a spring 80 the anterior end of which engages the posterior end of the clamping cone 70. The posterior end of the spring engages a bracing surface 93 on the anterior end 91 of the clevis swivel component 131 or within the interior body of the component 131. In another embodiment, the compressible spring 80 may have a spanner element attached at its anterior posterior end to extend the overall length of the spring component 80. In one embodiment, useful springs of the present disclosure are 1-inch to 5-inches in length. In another embodiment, useful springs are 1.5-inches to-3-inches in length. Preferred spring lengths will depend on the overall length chosen for the bursting pipe head device, as well as the selected length of the cable clamping cone. As shown herein, the spring is manually seated in the clevis swivel component. It also is contemplated that the posterior end of the spring could be welded or more permanently fixed to the clevis component if desired.

When the end cap 100 is locked into the cone body 10, the internal components: clevis swivel, spring, and cable clamping cone are engaged with one another at their anterior and posterior ends as described above and shown in FIGS. 1 and 4. As shown in FIGS. 1 and 3B, the anterior end of the cone body comprises an axial opening 21. The internal cable clamping mechanism of the present disclosure provides a means for introducing into the axial opening 21 a member or element competent to pass through the axial opening 21 and compress the cable clamping cone 70 against spring 80 such that spring 80 is compressed against the backstop or bracing surface, ledge or floor provided by clevis swivel component 131, and the cable clamping cone members 77 are pushed back from the head cone nose 10 by the aligned, indexed and repelling magnets 74 such that the member joining surfaces of each member 77 no longer are in contact. Moreover, the magnets 74 on the member surfaces 73 provide repelling forces such that the clamping cone members stay away from each other in the absence of compression force from spring 80. As used herein, this relative position of the cable clamping cone members is referred to as their "dissociated position."

The compressing element further has means for holding the spring in its compressed position, and thereby holding the clamping cone members in their dissociated position. The compressing element further has an axial opening of a diameter sufficient for a free cable end to pass therethrough and enter into the cone head interior. When the compressing element is in its compressing, engaged position, the cable clamping cone members are dissociated sufficiently that the cable can continue through the axial opening or channel 72 created by the member pieces, and on to the backstop provided by the clevis swivel component. In one embodiment, the cable also passes through the axial opening of the compressed spring. In another embodiment, the cable backstop and the compressible spring backstop are one and the same. In another embodiment, the cable backstop occurs distal to the spring backstop.

Once the cable is in place against its backstop, the compressing element is removed or extracted out from the cone body interior sufficiently to allow the compressible spring 80 to expand and push the cable clamping cone members forward into the cone head. The spring is of a length and force sufficient to move the outer camming surfaces of the cable clamping members 77 against the interior walls of the nose body until the angle of the nose body interior limits further forward movement. As the forward movement of the clamping cone is inhibited, the cable clamping members are forced down onto the cable surface. Thus the spring 80 provides sufficient compressible force to overcome the repelling force of the magnets 74. The channel 72 of the cable clamping members, together defining the axial opening of the cable clamping cone, are textured, preferably by means of being threaded, thereby providing means to bite into the cable. The free end of the cable is now engaged in the bursting pipe head device. As the bursting pipe head device is pulled through the existing pipe by means of the cable that extends out from the front of the head cone body, the pulling motion tends to force the cable clamping members further forward into the cone nose the constriction of which continually forces the members down onto the cable surface such that they tend to increase their bite or grip on the cable.

When the bursting pipe head device and pulling apparatus have pulled the product pipe through the existing pipe, and the bursting pipe head has arrived at the pulling or exit pit, the cable is released by re-engaging the compressing element such that the cable clamping cone members 77 are pushed back down the nose cone body and away from the cable surface, and the spring 80 is compressed against its backstop. The compressing element once again is held in the compressing position, the repelling force of the magnets again move the cable clamping members away from each other and the cable, and preferably actively pressed against the interior surface of the bursting head cone body. The cable, now disengaged from the cable clamping cone members, can be pulled out of the nose body axial opening. Here again, the magnets 74 on the member joining surfaces 73 are aligned with one another and their repelling force serves to keep the member pieces back and away from the cable surface, allowing easy cable extraction without need of opening the bursting head device itself.

An embodiment of the cable engaging and release mechanism of the present disclosure is shown in FIGS. 1 and 7. In this embodiment, the compressing element comprises a threaded mechanical screw 60 (FIG. 7A) and the axial opening 21 of the nose body 20 is threaded and dimensioned to receive and engage the mechanical screw FIG. 7B. The threaded engagement holds the mechanical screw in its compressing position for introducing a free cable end 200 into the nose cone body 20, and for extracting the free cable end from the nose cone body. Those of ordinary skill in the art will appreciate that the length of the mechanical screw and the corresponding length of receiving threads in the cone head axial opening 21 will depend on the length of the cone head and the corresponding length of the cable clamping cone 70 and compressible spring 80. Useful mechanical screw lengths can range from 1-inch to 7-inches, with typical lengths ranging in the vicinity of about of 1.5-inch to 3-inches. In a preferred embodiment the mechanical screw defines a left-threaded screw. Cables tend to unwind in a right-handed manner as they are pulled, which would tend to unscrew the mechanical screw over time if its threads defined a right-threaded screw. Using a left-threaded screw holds the screw in the axial opening as the cable is pulled and tends to unwind. The screw further comprises an axial opening or channel 62 dimensioned to allow a cable to pass therethrough (FIGS. 7A and 7D). The threads on mechanical screw illustrated in the embodiments in FIGS. 4 and 7A do not extend the full length of the screw, providing a hollow bore portion 63 for ease for seating the mechanical screw in the cone body. In another embodiment, the threads could extend the full length of the screw body.

Figure 7A:
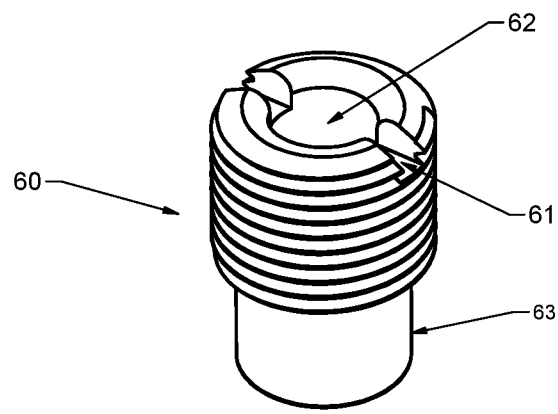
FIG. 7A-7D illustrate (A) the mechanical screw illustrated in FIG. 1; (B) the threaded axial opening at the anterior end of the nose cone, ready to receive the mechanical screw; (C) a quick release cable spanner tool in accordance with one embodiment of this disclosure; and (D) the spanner tool sitting on the cable about to engage with the threaded mechanical screw spanner slot.
Figure 7B:
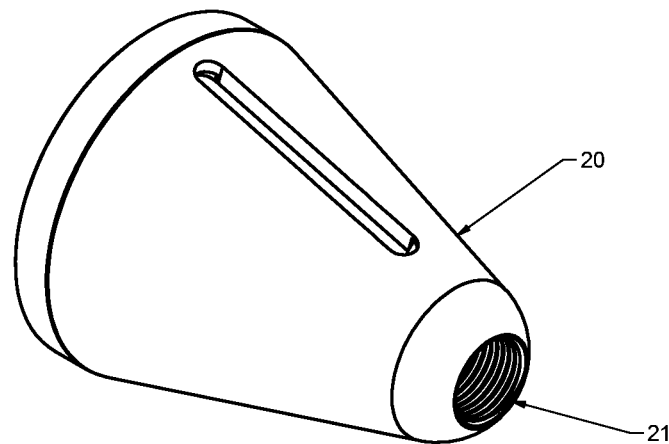
Figure 7C:
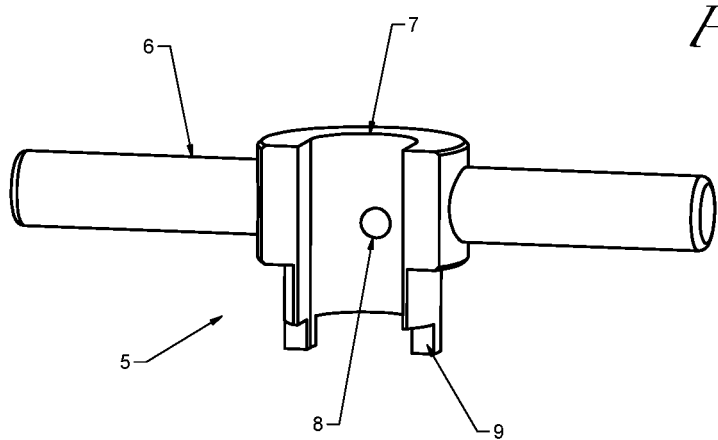
Figure 7D:
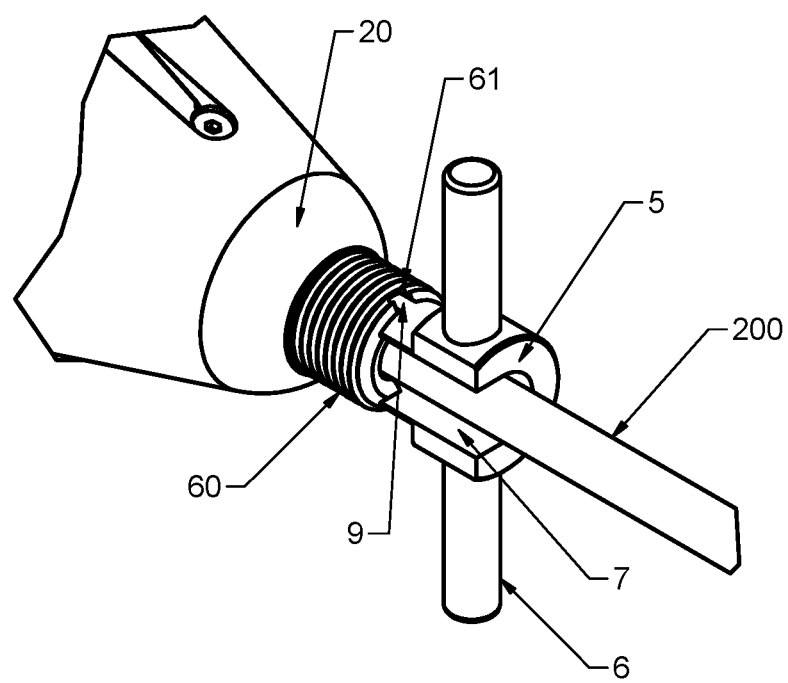

In another embodiment of the present disclosure the compressing element is engaged with the cable clamping mechanism by means of spanner key or spanner wrench 5 (FIG. 7C). The spanner key 5, also referred to herein as a spanner tool or a cable release spanner tool, comprises two spanner pins 9 spaced 180° apart and dimensioned to fit into spanner pin slots 61 spaced 180° apart on the anterior surface of the mechanical screw 62 (FIG. 7A). In another embodiment the spanner key further comprises half of a cylinder body 7 having an axial opening or channel dimensioned to allow the concave surface 7 of the cylinder to sit or lay on the cable surface. In still another embodiment the inner concave surface of the cylinder body further comprises at least one magnet 8 and indexed such that the spanner key can engage the cable surface by means of attractive magnetic force. In another embodiment the spanner key comprises a means for facilitating application of mechanical force to turn the mechanical screw with the spanner tool. In one embodiment, the means comprises an arm 6 extending from the spanner tool. In a preferred embodiment the means comprises two arms 6 spaced 180° apart and extending laterally from the cylinder body 7. The arms allow for easy turning of the mechanical screw both (1) into the nose body such that the mechanical screw is in its engaged compressing position allowing a free cable end to be introduced or extracted from the nose body, and (2) out of the nose body sufficiently to allow the internal spring 80 to push the cable clamping cone members forward and onto the cable surface. In one embodiment, the screw length and the axial opening threading length are dimensioned such that the screw is recessed into the threaded axial opening 21 when it is in the engaged, compressing position. In another embodiment, the mechanical screw head is substantially flush with the axial opening 21 when it is in the non-compressing position, and a cable is engaged. FIG. 7D shows a mechanical screw 60 partially threaded into a nose cone body 20, a spanner key 5 engaged with the screw head by means of the spanner pins 9 engaged with the spanner slots 61, the key and screw being turned by means of the spanner arms 6. Sitting in the spanner key channel 7 is a cable 200. The mechanical screw is in a non-compressing position, and the free-end of a cable has been introduced into the nose body through the axial opening in the mechanical screw.

Embodiments of the disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The embodiments of the invention in which an exclusive property or privilege is claimed are defined as follows:

1. A method for increasing the facility of introducing a replacement pipe into an existing pipe opening underground, the method comprising the steps of:
    (a) providing a bursting head device comprising a cone body having
        an anterior and posterior end and dimensioned to burst or fracture a pipe when pulled through said pipe;
        an axial opening at said anterior end for receiving a free cable end;
        a substantially hollow interior dimensioned to accommodate means for retaining said free cable end in said bursting head device, and
        coupling means extending from said cone body posterior end for connecting said bursting head device to a replacement pipe, said coupling means consisting essentially of a joint linkage followed by pipe attachment means, said joint linkage competent to allow rotation about at least two cone body perpendicular axes, such that said retained cable can pull said bursting head device and said coupled replacement pipe through said pipe and said coupled replacement pipe can rotate independent of said bursting head in the range of at least about 90° about each of the vertical and transverse axes of said cone body when said replacement pipe is coupled to said device, and
    (b) linking the anterior end of said replacement pipe to said coupling means, such that said coupled replacement pipe can rotate independent of said bursting head about each of the vertical and transverse axes of said cone body.

2. The method of claim 1 wherein said cable retaining means comprises a cable clamping mechanism.

3. A method for pulling a replacement pipe through an existing pipe opening underground, the method comprising the steps of:
    (a) providing a mechanical pulling device for pulling cable through pipe underground;
    (b) providing a cable having a free cable end;
    (c) providing a bursting head device comprising:
        a tapered cone body having an anterior and posterior end and dimensioned to burst or fracture a pipe when pulled through said pipe;
        means for securing a free cable end provided to the anterior end of said cone body, and
        coupling means extending from said cone body posterior end for connecting said bursting head device to a replacement pipe, said coupling means consisting essentially of a joint linkage followed by pipe attachment means, said joint linkage competent to allow rotation about at least two cone body perpendicular axes, such that said secured cable can pull said bursting head device and said coupled replacement pipe through said pipe and said coupled replacement pipe can rotate independent of said bursting head in the range of at least about 90° about each of the vertical and transverse axes of said cone body;
(d) attaching said cable free end to the anterior end of said cone body;
(e) linking the anterior end of said replacement pipe to said coupling means, such that said coupled replacement pipe can rotate independent of said bursting head about each of the vertical and transverse axes of said cone body, and
(f) pulling said coupled bursting head and replacement pipe through said pipe by means of said mechanical pulling device when said cable is connected to said puling device.

4. The method of claim 1 or 3 wherein said joint linkage includes a manually engageable connection.

5. The method of claim 4 wherein said manually engageable connection comprises a clevis fastener component.

6. The method of claim 1 or 3 wherein said joint linkage comprises a pin.

7. The method of claim 1 or 3 wherein said pipe attachment means comprises a universal duct puller.

8. The method of claim 1 or 3 wherein said joint linkage extends out from a detachable end cap that can be removably attached to the posterior end of said cone body.

9. The method of claim 1 or 3 wherein said joint linkage further allows rotation of said coupled replacement pipe about the cone body longitudinal axis.

10. The method of claim 9 wherein said rotation about said cone body longitudinal axis is in the range of about 360°.

11. A bursting head device for use in underground pipe replacement, the bursting head device comprising:
a cone body having
an anterior and posterior end and dimensioned to burst or fracture a pipe when pulled through said pipe;
an axial opening at said anterior end for receiving a free cable end;
a substantially hollow interior dimensioned to accommodate means for retaining said free cable end in said bursting head device, and coupling means extending from said cone body posterior end for connecting said bursting head device to a replacement pipe, said coupling means consisting essentially of a joint linkage followed by pipe attachment means, said joint linkage competent to allow rotation about at least two cone body perpendicular axes, such that said retained cable can pull said bursting head device and said coupled replacement pipe through said pipe and said coupled replacement pipe can rotate independent of said bursting head in the range of at least about 90° about each of the vertical and transverse axes of said cone body.

12. The bursting head device of claim 11 when in said joint linkage further allows rotation of said coupled replacement pipe about the cone body longitudinal axis.

13. The bursting head device of claim 12 wherein said rotation about said cone body longitudinal axis is in the range of about 360°.

14. The bursting head device of claim 12 wherein said pipe attachment means comprises a universal duct puller.

15. The bursting head device of claim 12 wherein said joint linkage extends out from a detachable end cap that can be removably attached to the posterior end of said cone body.

16. The bursting head device of claim 11 wherein said joint linkage includes a manually engageable connection.

17. The bursting head device of claim 16 wherein said manually engageable connection comprises a clevis fastener component.

18. The bursting head device of claim 11 wherein said joint linkage comprises a pin.

19. The bursting head device of claim 11 wherein said pipe attachment means comprises a universal duct puller.

20. The bursting head device of claim 11 wherein said joint linkage extends out from a detachable end cap that can be removably attached to the posterior end of said cone body.

21. The bursting head device of claim 11 wherein said cone body outer angle is in the range of about 15°-40°.

22. The bursting head device of claim 11 wherein said cable retaining means comprises a cable clamping mechanism.

23. The bursting head device of claim 11 wherein said cone body further comprises a cutting knife on the cone body outer surface.

24. A bursting head device for use in underground pipe replacement, the bursting head device comprising:
a tapered cone body having an anterior and posterior end and dimensioned to burst or fracture a pipe when pulled through said pipe;
means for securing a free cable end provided to the anterior end of said cone body, and
coupling means extending from said cone body posterior end for connecting said bursting head device to a replacement pipe, said coupling means consisting essentially of a joint linkage followed by pipe attachment means, said joint linkage competent to allow rotation about at least two cone body perpendicular axes, such that said secured cable can pull said bursting head device and said coupled replacement pipe through said pipe and said coupled replacement pipe can rotate independent of said bursting head in the range of at least about 90° about each of the vertical and transverse axes of said cone body.

25. The bursting head device of claim 24 wherein said joint linkage further allows rotation of said coupled replacement pipe about the cone body longitudinal axis.

26. The bursting head device of claim 24 wherein said joint linkage comprises a pin.

27. The bursting head device of claim 24 wherein said joint linkage comprises a comprises includes a manually engageable connection.

28. The bursting head device of claim 24 wherein said joint linkage extends out from a detachable end cap that can be removably attached to the posterior end of said cone body.

29. The bursting head device of claim 24 wherein said pipe attachment means comprises a universal duct puller.

* * * * *